US010540221B2

(12) United States Patent
Shevelenok et al.

(10) Patent No.: US 10,540,221 B2
(45) Date of Patent: Jan. 21, 2020

(54) FLEXIBLE SENT DEVICE CONFIGURATION

(71) Applicant: Melexis Technologies NV, Tessenderlo (BE)

(72) Inventors: Ivan Shevelenok, Kiev (UA); Asparuh Grigorov, Sofia (BG); Viktor Kassovski, Sofia (BG)

(73) Assignee: Melexis Technologies NV, Tessenderlo (BE)

( * ) Notice: Subject to any disclaimer, the term of this patent is extended or adjusted under 35 U.S.C. 154(b) by 440 days.

(21) Appl. No.: 14/923,704

(22) Filed: Oct. 27, 2015

(65) Prior Publication Data

US 2016/0124798 A1    May 5, 2016

(30) Foreign Application Priority Data

Oct. 29, 2014    (GB) .................................... 1419205.8

(51) Int. Cl.
| | | |
|---|---|---|
| *G06F 11/07* | (2006.01) | |
| *G06F 13/42* | (2006.01) | |
| *G06F 13/38* | (2006.01) | |
| *G06F 11/34* | (2006.01) | |
| *G06F 9/445* | (2018.01) | |

(52) U.S. Cl.
CPC ...... *G06F 11/0772* (2013.01); *G06F 11/0736* (2013.01); *G06F 11/0751* (2013.01); *G06F 11/0778* (2013.01); *G06F 13/385* (2013.01); *G06F 13/4295* (2013.01)

(58) Field of Classification Search
CPC ........ G01M 17/00; G06F 11/00; G06F 19/00; F02D 9/10
See application file for complete search history.

(56) References Cited

U.S. PATENT DOCUMENTS

| 5,333,268 | A  | * | 7/1994 | Douglas ................. G06F 11/08 370/408 |
|---|---|---|---|---|
| 8,645,020 | B2 | * | 2/2014 | Tomar ................... G01P 15/125 327/100 |
| 8,694,879 | B1 | | 4/2014 | Peichl et al. |
| 2003/0012259 | A1 | * | 1/2003 | Callaway, Jr. ....... H04B 1/7075 375/140 |
| 2009/0106461 | A1 | * | 4/2009 | Terayama ................ G06F 1/12 710/19 |

(Continued)

OTHER PUBLICATIONS

GB Search Report from corresponding GB Application No. 1419205. 8, dated Apr. 29, 2015.

(Continued)

*Primary Examiner* — Getente A Yimer
(74) *Attorney, Agent, or Firm* — Workman Nydegger

(57) ABSTRACT

The present invention relates to an integrated circuit device comprising an output port for transmitting a data stream and a processor for controlling the transmission of the data stream in accordance with a single-edge nibble transmission protocol. The device also comprises a configuration means for receiving and storing configuration data. The processor is adapted for reporting a plurality of diagnostic statuses via the data stream by transmitting for each diagnostic status a corresponding diagnostic code defined by the configuration data, and wherein the processor is furthermore adapted for reporting the plurality of diagnostic statuses in a diagnostic status reporting order defined by the configuration data.

15 Claims, 2 Drawing Sheets

(56) References Cited

U.S. PATENT DOCUMENTS

| | | | |
|---|---|---|---|
| 2012/0036922 A1* | 2/2012 | Bauerle | G01M 15/02 |
| | | | 73/114.36 |
| 2013/0020660 A1* | 1/2013 | Milano | G01R 15/207 |
| | | | 257/427 |
| 2014/0258566 A1 | 9/2014 | Bowling et al. | |
| 2016/0371164 A1* | 12/2016 | Bos | G06F 11/263 |

OTHER PUBLICATIONS

"Programmable Linear Hall Sensor", Infineon, Target Data Sheet, vol. 1, Jan. 2007, pp. 1-34.
"Surface Vehicle Information Report", SAE International, www.sae.org, Jan. 2010, pp. 1-56.
European Search Report from Application No. 15191631.9, dated Feb. 25, 2016.

\* cited by examiner

FLEXIBLE SENT DEVICE CONFIGURATION

FIELD OF THE INVENTION

The invention relates to the field of data transmission according to the Single Edge Nibble Transmission (SENT) standard. More specifically, it relates to an integrated circuit device, e.g. a SENT transmitter device such as a SENT-capable sensor, for transmitting data via the SENT protocol and a related method for implementing the SENT protocol in integrated circuits in an application independent manner.

BACKGROUND OF THE INVENTION

The SENT protocol (SAE J2716 standard) provides signal transmission from a transmitter device, e.g. an integrated circuit (IC) sensor, to a receiver device, e.g. an Electronic Control Unit (ECU). The SENT protocol may for example provide a low-cost and efficient alternative to, for example, analogue or PWM interfaces for sensor applications.

The SENT encoding scheme may be particularly suitable for use in applications where high resolution sensor data needs to be communicated from a sensor to an ECU. The SENT standard defines a unidirectional communications scheme from a transmitting device, e.g. a sensor, to a receiving device, e.g. a controller, which does not require a coordination and/or synchronization signal from the receiving device. Thus, the transmission may proceed independently of the receiver module.

An integrated circuit sensor for automotive applications may provide an output mode for reporting sensor information and/or other diagnostic information, such as cyclic redundancy check (CRC) information, via a SENT telegram compliant with the SAE-J2716 Surface Vehicle Information Report standard. The number of nibbles is typically fixed for each application of the encoding scheme, but can vary between applications.

An integrated circuit (IC) device for SENT communication as known in the art may use a fixed configuration for its communication channels, e.g. defining a data mapping to fast and slow channels. Thus a device, e.g. a transmitter or receiver device as known in the art, that is adapted for SENT communication may have a configuration-specific hardware design or firmware to take the SENT protocol configuration into account.

The SENT serial data communication protocol may be used for transmission of signal values, e.g. messages, from a transmitter device to a receiver device with high resolution. The implementation of the SENT protocol in IC implies a fixed user message configuration for its communication channels, e.g. fast and slow channels. The configuration may depend on the intended application, and changing the configuration in order to address different applications may require redesign of the IC hardware and/or firmware.

For example, the configuration may be hardwired, such that the IC device is specifically designed for a single configuration corresponding to a specific application. Alternatively, the IC device may be provided by a read-only memory (ROM) which can be programmed for a specific SENT message configuration. Thus, the IC can be redesigned for a different configuration by adapting the firmware accordingly; however, the end-product device provided with such application-specific ROM may be only suitable for use in the configuration the firmware is designed for.

The device may comprise a one-time programmable non-volatile memory (OTP), such that the change of the SENT message configuration can be realized through programming the device with a suitable software construct, taking into account the restrictions of the available memory space. Thus, a device can be programmed to a specific application after manufacturing but prior to use. Furthermore, an IC device may also comprise a FLASH memory or an electrically erasable programmable read-only memory (EEPROM), such that the change of the SENT message configuration can be realized through software change, taking into account restrictions of the available memory space.

Configuration of an integrated circuit SENT transmitter device may comprise, for the SENT fast channels, e.g. the data transmitted via the data nibbles, defining the number of channels, the information associated with each channel, the data nibbles order format, the method of status bits processing, the fast channel diagnostic error codes and the reporting priority of the fast channel diagnostic error codes. Furthermore, configuration for the SENT slow channels may further comprise the defining of the association of every SENT slow channel message with an ID number, an ID memory location, a message order, the slow channel diagnostic error codes and the reporting priority of slow channel diagnostic error codes.

SUMMARY OF THE INVENTION

It is an object of embodiments of the present invention to provide easy configuration and reconfiguration of a SENT-capable integrated circuit device.

The above objective is accomplished by a method and device according to the present invention.

In a first aspect, the present invention relates to an integrated circuit device comprising an output port for transmitting a data stream, a processor, e.g. a processing means, for controlling the transmission of the data stream in accordance with a single-edge nibble transmission (SENT) protocol, e.g. programmed for controlling said transmission in accordance with said SENT protocol, and a configuration means for receiving and storing configuration data. The processor is adapted for, e.g. configured or programmed for, reporting a plurality of diagnostic statuses via the data stream by transmitting for each diagnostic status a corresponding diagnostic code defined by the configuration data. The processor is furthermore adapted for reporting the plurality of diagnostic statuses in a diagnostic status reporting order defined by the configuration data.

In an integrated circuit device according to embodiments of the present invention, the configuration means may be adapted for receiving configuration instructions from a user and for storing this configuration data in accordance with the configuration instructions.

In an integrated circuit device according to embodiments of the present invention, the processor may be adapted for retrieving at least one address pointer from the configuration means. The at least one address pointer may reference data or may reference a program routine for acquiring this data, in which the data is to be transmitted in a corresponding SENT fast channel or in a corresponding SENT slow channel message of the data stream.

In an integrated circuit device according to embodiments of the present invention, the processor may be adapted for detecting the plurality of diagnostic statuses and for setting a status bit state in a status and communication nibble transmitted via the data stream taking into account the detected diagnostic statuses and a status bit mask in the configuration data.

In an integrated circuit device according to embodiments of the present invention, the processor may be adapted for reporting at least one diagnostic status of the plurality of diagnostic statuses by transmitting a diagnostic code value via a SENT fast channel.

In an integrated circuit device according to embodiments of the present invention, the processor may be adapted for reporting at least one diagnostic status of the plurality of diagnostic statuses by transmitting a diagnostic code value via a SENT slow channel message.

In an integrated circuit device according to embodiments of the present invention, the processor may be adapted to retrieve at least one value from the configuration means for selecting the number of nibbles to transmit per SENT telegram.

In an integrated circuit device according to embodiments of the present invention, the configuration means may comprise a configuration memory for storing the configuration data.

An integrated circuit device according to embodiments of the present invention may furthermore comprise input/output means for acquiring and digitizing data, for example at least one input port for receiving data. For example, the input/output means may comprise at least one input port for receiving at least one analog signal, e.g. from a sensor device, and at least one analog to digital converter for digitizing the analog signal. The input/output means may comprise at least one output port, for example an output port for sending a control signal to a device to be controlled, such as an actuator, or for outputting other data, e.g. information to be displayed on a display.

In an integrated circuit device according to embodiments of the present invention, the processor may comprise a data memory and an instruction memory.

In an integrated circuit device according to embodiments of the present invention, the instruction memory may comprise instructions according to a program logic for controlling the input/output means such as to acquire and digitize data, and for controlling the data transmission via the output port such as to comply with the SENT protocol.

In a second aspect, the present invention relates to a method for controlling an integrated circuit device adapted for transmitting data via a data stream in accordance with a single-edge nibble transmission protocol. The method comprises receiving configuration instructions from a user, storing configuration data in accordance with the configuration instructions, and controlling a transmission of a data stream in accordance with a single-edge nibble transmission protocol. This controlling of the transmission of the data stream comprises reporting a plurality of diagnostic statuses via the data stream by transmitting for each diagnostic status a corresponding diagnostic code defined by the configuration data. Reporting the plurality of diagnostic statuses is furthermore performed in a diagnostic status reporting order defined by the configuration data.

In a method according to embodiments of the present invention, the controlling of the transmission may furthermore comprise retrieving at least one address pointer from the configuration data in order to reference data or reference a program routine for acquiring this data, and transmitting the data in a corresponding SENT fast channel or in a corresponding SENT slow channel message of the data stream.

In a method according to embodiments of the present invention, the controlling of the transmission may comprise detecting the plurality of diagnostic statuses and setting a status bit state in a status and communication nibble transmitted via the data stream taking into account the detected diagnostic statuses and a status bit mask in the configuration data.

In a method according to embodiments of the present invention, the reporting of the plurality of diagnostic statuses may comprise transmitting a diagnostic code value via a SENT fast channel and/or via a SENT slow channel message.

It is an advantage of embodiments of the present invention that the SENT configuration can be changed without requiring a hardware or firmware update of the transmitter device, e.g. without requiring hardware or software redesign.

It is an advantage of embodiments of the present invention that an application independent SENT data protocol implementation is provided in an integrated circuit device in an efficient manner.

It is an advantage of embodiments of the present invention that versatile configuration and/or reconfiguration of the SENT transmissions of an integrated circuit device can be achieved through the update of a data structure stored in a memory unit, e.g. a non-volatile memory of the device.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
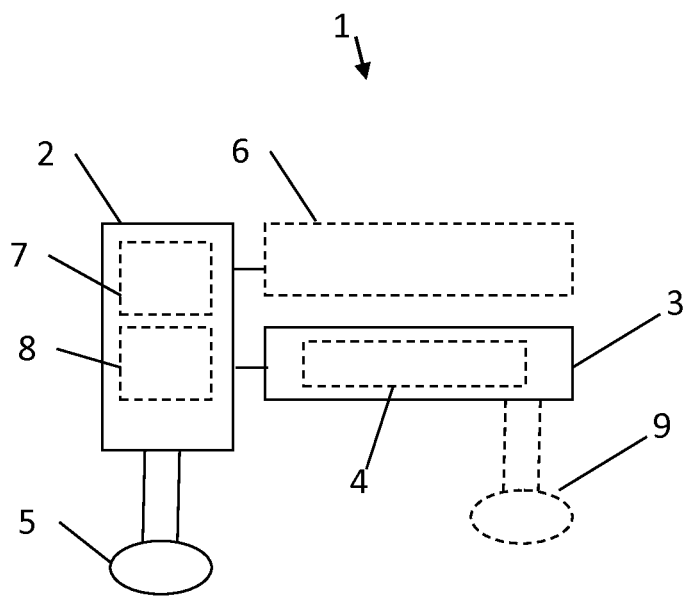
FIG. 1 shows an exemplary integrated circuit device according to embodiments of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where herein below is referred to the Single Edge Nibble Transmission (SENT) protocol, reference is made a protocol, such as the SAE J2716 standard, that defines a transmission telegram consisting of a plurality of nibbles in sequence, in which each nibble consists of 4 bits coded by Pulse Width Modulation (PWM) with reference to the falling edge, hence the term "single edge nibble" in the protocol acronym. The first nibble of such telegram, e.g. directly following a synchronization pulse, may for example contain internal status and diagnostic information. This first nibble may be followed by one to six data nibbles, e.g. for reporting sensor information. A final nibble in the transmission telegram may for example comprise redundancy check information. While the number of nibbles may be fixed for a specific application of the encoding scheme, this number may vary between applications. For example, if one 12-bit value is to be transmitted, three data nibbles may be used, while if two 8-bit values need to be transmitted, four data nibbles may be used.

SENT may also provide a mechanism for broadcasting information at a much slower rate, for example for communicating information that is less time-critical, such as conversion coefficients from raw data to physical values, the manufacturer's name, the type of sensor or an serial identification tag of the sensor. This mechanism may rely on bits in the status and communication (S&C) nibble of the SENT telegram, e.g. two bits in the S&C nibble may be designated to convey the slow channel. These bits may be accumulated from a plurality of consecutive telegrams, e.g. from 16 or 18 adjacent messages, and grouped to form a message ID, a message value and a CRC. In a first aspect, the present invention relates to an integrated circuit (IC) device comprising an output port for transmitting a data stream; a processing means, e.g. a processor, for controlling the transmission of this data stream in accordance with a single-edge nibble transmission protocol; and a configuration means for receiving and storing configuration data, e.g. for receiving configuration instructions from a user and for storing configuration data corresponding to these configuration instructions. The processing means is adapted for reporting a plurality of diagnostic statuses, e.g. errors, via the data stream by transmitting for each diagnostic status a corresponding diagnostic code defined by the configuration data. The processing means is furthermore adapted for reporting this plurality of diagnostic statuses in a diagnostic status reporting order defined by the configuration data.

An integrated circuit device 1 according to embodiments of the present invention is shown in FIG. 1. The integrated circuit device may be an application specific standard product (ASSP) for collecting and transmitting sensor data. For ASSP ICs, product flexibility is preferred in order to serve multiple end users, which makes an extra cost for using CPU resources cost effective as it avoids the cost of redesigns.

This device, e.g. an integrated circuit sensor for automotive applications, may provide an output mode for reporting data, e.g. sensor information and/or diagnostic information, via SENT telegrams compliant with the SAE-J2716 Surface Vehicle Information Report. Thus, the integrated circuit sensor may be a SENT transmitter device, e.g. a SENT data transmitter. The device 1 comprises an output port 5 for transmitting a data stream, e.g. for relaying SENT telegrams over a wire harness to a receiving node, such as a SENT receiver device. For example, the data may be transmitted to an engine control unit. The integrated circuit device may also comprise input/output means 6 for acquiring and digitizing data, e.g. sensor data. For example, the input/output means may comprise output signal lines for controlling the acquisition and digitization of data by a sensor component and input signal lines for receiving digitized data from this sensor component.

The integrated circuit device 1 further comprises a processing means 2, e.g. a processor, for controlling the transmission of the data stream in accordance with a single-edge nibble transmission protocol, e.g. in accordance with the SENT protocol defined by the SAE-J2716 Surface Vehicle Information Report standard. The processing means may be a processing component of the integrated circuit device. The processing means may comprise a data memory 7, e.g. a processor register memory and/or a random access memory, and an instruction memory 8, e.g. a read-only memory (ROM) or a programmable non-volatile memory such as a one-time programmable memory (OTP) or an electrically erasable read-only memory (EEPROM). The processing means may further comprise runtime instruction processing means for fetching and executing instructions stored in the instruction memory. Such instructions may comprise program logic for controlling the input/output means 6 (I/O) such as to acquire and digitize data, e.g. sensor data. Particularly, these instructions may also comprise program logic for controlling the data transmission via the output port 5 such as to comply with the SENT protocol. Furthermore, where herein below reference is made to the processing means 2 being adapted for performing a task, it will be clear that the processing means may be programmed to perform such task, e.g. via machine-executable instructions forming a firmware program stored in the instruction memory 8.

The integrated circuit device 1 further comprises a configuration means 3 for receiving and storing configuration data. For example, the integrated circuit device 1 may be provided with a configuration port 9 for receiving the configuration data, e.g. which may be provided by a user in order to set up the device for a specific application. Thus, the configuration means 3 may comprise a configuration port 9 for receiving the configuration data. The configuration means 3 may for example comprise a configuration memory 4, such as an OTP memory, a flash memory or an electrically erasable programmable read-only memory (EEPROM), for storing the configuration data. It is an advantage of such configuration means 3 that the device can be easily adapted to a specific application without requiring a hardware redesign and/or change of a firmware product controlling the processing means 2. Embodiments of the present invention enable a SENT message configuration of the device, for example in order to adapt to a specific application, by supplying the corresponding configuration data to the device. The device can be easily reconfigured without requiring changes in hardware or firmware. This SENT message configuration may be realized via programming of a configuration memory map stored in the configuration memory 4, e.g. in a programmable configuration memory. This configuration does not require a change of software, such as a change of software by providing a firmware program to control the device in accordance with a specific configuration, or a change of hardware, e.g. by replacing a ROM module or redesigning the physical architecture of the device. Furthermore, the memory allocated to the configuration memory map may be independent of the specific configuration, such that changing the configuration of the device can be advantageously performed without affecting the memory in use in the integrated circuit device.

The processing means 2 may be adapted for encapsulating data, e.g. sensor data, in nibble frames in the data stream taking the configuration data into account. In the data stream transmitted via the output port, at least one SENT telegram may be transmitted, e.g. a serial stream of such telegrams. Such telegram may comprise a sequence of a synchronization pulse, a first nibble comprising internal status and diagnostic information, one to six data nibbles, e.g. for reporting sensor information and a nibble for sending a CRC, and may be optionally terminated by pause pulse. The number of data nibbles may be typically fixed for each application of the encoding scheme, but can vary between applications. The data transmitted in the data nibbles are commonly referred to as fast channel data, as opposed to slow channel data discussed further herein below. For example, if one 12-bit value is to be transmitted, three data nibbles may be used forming a single fast channel, while if two 8-bit values need to be transmitted, two data nibbles may be used for each of two fast channels. The configuration data may comprise at least one value for selecting the number of nibbles to transmit per SENT telegram, e.g. may comprise two such values corresponding to the number of nibbles to allocate per fast channel to be transmitted. Alternatively, the number of nibbles may be fixed to 3 nibbles, thus 12 bits, per fast channel, e.g. the device may transmit two data 12 bit values per SENT telegram. Although this does not allow transmitting 16 bits data, e.g. raw analog-to-digital converter data, via the SENT fast channel, it may advantageously enable a more robust and simple software implementation.

The configuration data may also comprise a flag for controlling the transmission of a pause frame, e.g. a pause pulse terminating each telegram, in accordance with the SENT protocol. Thus, the processing means 2 may be adapted to retrieve at least one value from the configuration means for selecting the number of nibbles to transmit per SENT telegram, e.g. a plurality of values for selecting the number of nibbles to transmit, e.g. one such value per fast channel. The processing means 2 may be adapted to retrieve at least one flag from the configuration means for activating or deactivating a pause frame in the SENT telegrams transmitted via the data stream.

Furthermore, the configuration data may also comprise at least one address pointer, e.g. one address pointer per fast channel for accessing the data to be transmitted. For example such address pointer may store a memory address or I/O port address where the data to be transmitted can be retrieved, or such address pointer may store an instruction memory address of a program routine for retrieving the data to be transmitted. Thus, the processing means 2 may be adapted for retrieving at least one address pointer from the configuration means that references the data to be transmitted or that references a program routine for acquiring the data to be transmitted, in which this data is to be transmitted in a corresponding SENT fast channel of the data stream. Where in a device as known in the art a fixed memory address referencing the data to be transmitted in the or each fast channel may be used, e.g. hardcoded in the firmware as a low cost and low complexity implementation, embodiments of the present invention advantageously provide more flexibility, e.g. may provide more versatile configuration options.

The configuration data may also comprise application specific fast channel configuration information, e.g. application specific fast channel configuration information such as information relating to secure sensor configuration, a flag to invert the nibble order for the second fast channel and/or a flag to invert the data for the second fast channel. Thus, the processing means 2 may be adapted for retrieving such application specific fast channel configuration information from the configuration means.

The processing means 2 is adapted for reporting a plurality of diagnostic statuses, e.g. errors, via the data stream by transmitting for each diagnostic status a corresponding diagnostic code defined by the configuration data.

The configuration data may comprise a mask to enable or disable status reporting in at least one SENT status bit, e.g. the status bits in the status and communication (S&C) nibble of each transmitted SENT telegram. For example, the processing means 2 may be adapted for detecting a plurality of diagnostic statuses, e.g. errors, and for setting a status bit state in a status and communication nibble and a status bit mask in the configuration data. This status bit mask may comprise for each diagnostic status which may be detected by the processing means a flag, or plurality of flags, to indicate whether and/or by which status bit the corresponding diagnostic status is to be reported. For example, each error that may be detected by the processing means, e.g. which is provided for by a firmware executed by the processing means, may have a separate reporting configuration for each SENT status bit.

The processing means 2 may furthermore be adapted for reporting at least one diagnostic status of said plurality of diagnostic statuses by transmitting a diagnostic code value via a SENT fast channel. For example, the configuration data may comprise a plurality of correspondences between diagnostic statuses that can be detected by the processing means 2 and values to be transmitted via a SENT fast channel. Furthermore, the configuration data may comprise such a plurality of correspondences for each SENT fast channel. These values to be transmitted via a SENT fast channel to indicate a diagnostic status may lie within a predetermined range, e.g. in order to easily differentiate such values from normal data values communicated via the fast channel, for example in the range of 4089 to 4095 for a 12-bit channel.

The processing means 2 is furthermore adapted for reporting the plurality of diagnostic statuses in a diagnostic status reporting order defined by the configuration data. For example, if a plurality of statuses is detected, each of this plurality of statuses having a corresponding value to be transmitted via the same SENT fast channel defined in the configuration data, this plurality of statuses may be reported in consecutive SENT telegrams in an order defined in the configuration data. However, in embodiments of the present invention, if a plurality of statuses is detected, e.g. a number N>1 of simultaneously occurring errors, only the status with the highest priority may be reported, e.g. by replacement of the fast channel data by an error code, e.g. a corresponding error code in for example the range 4089 . . . 4095 as may be configured for each status, as described hereinabove. However, it is an advantage of embodiments of the present invention that the lower priority statuses may be communicated by a configurable diagnostic error code, e.g. a code configured for each error, sent in a SENT slow channel diagnostic message, as described further herein below.

The SENT standard also provides a mechanism for broadcasting information at a slower rate, for example for communicating information that is less (or even not at all) time-critical, such as conversion coefficients from raw data to physical values, manufacturer's name or type of sensor. This mechanism may rely on bits in the status and communication (S&C) nibble of the SENT telegram, e.g. the first nibble in a telegram transmitted before the data nibbles forming the fast channel or fast channels. For example, two bits in the S&C nibble may be designated to convey the slow channel. These bits may be accumulated from a plurality of consecutive telegrams, e.g. from 16 or 18 consecutive messages, and may be grouped to form a message ID, a message value and a CRC.

The configuration data may comprise a value for selecting the number of SENT slow channel messages. Alternatively, the configuration data may have a maximum number of slow channel messages which may be configured, e.g. may provide for up to 32 SENT slow channel messages, or even a higher number of slow channel messages, e.g. 64, 128 or 256, as may be determined by storage constraints and design considerations.

The configuration data may comprise a plurality of identification (ID) numbers, and for each ID number a corresponding slow channel message. The ID numbers may be 8-bit or 4-bit messages IDs. The configuration data may comprise a flag for selecting between a 12-bit or 16-bit data format for the slow channel messages. Furthermore, the configuration data may also comprise at least one address pointer, e.g. one address pointer per slow channel message for accessing the data to be transmitted in combination with the corresponding identification number defined in the configuration data. For example such address pointer may store a memory address or I/O port address where the data to be transmitted can be retrieved, or such address pointer may store an instruction memory address of a program routine for retrieving the data to be transmitted. Thus, the processing means 2 may be adapted for retrieving at least one address pointer from the configuration means that references the data to be transmitted or that references a program routine for acquiring the data to be transmitted, in which this data is to be transmitted in a corresponding SENT slow channel message of the data stream.

The processing means 2 is adapted for reporting a plurality of diagnostic statuses, e.g. errors, via the data stream by transmitting for each diagnostic status a corresponding diagnostic code defined by the configuration data.

For example, the processing means 2 may be adapted for detecting a plurality of diagnostic statuses, e.g. errors, and for reporting at least one diagnostic status of this plurality of diagnostic statuses by transmitting a diagnostic code value via a SENT slow channel message. For example, the configuration data may comprise a plurality of correspondences between diagnostic statuses that can be detected by the processing means 2 and values to be transmitted via a SENT slow channel message, e.g. corresponding slow channel message identification numbers and/or slow channel messages. For example, a plurality of statuses, e.g. errors, detectable by the firmware executing on the processing means may have corresponding 12-bit SENT slow channel error codes defined in the configuration data.

The processing means 2 is adapted for reporting the plurality of diagnostic statuses in a diagnostic status reporting order defined by the configuration data. For example, if a plurality of statuses is detected, each of this plurality of statuses having a corresponding value to be transmitted via the SENT slow channel defined in the configuration data, this plurality of statuses may be reported in consecutive SENT slow channel messages in an order defined by the configuration data. Thus, a fully configurable sequence of SENT slow channel messages may be provided by a table in the configuration data. As described hereinabove, the processing means 2 may be adapted for reporting the plurality of diagnostic statuses in a diagnostic status reporting order defined by the configuration data, such that a status to be reported that has the highest priority as defined by this diagnostic status reporting order is transmitted via a fast channel, while the statuses to be reported that have lower priorities are transmitted via the slow channel.

The processing means 2 may furthermore be adapted for validating the configuration data, e.g. when received by the configuration means 3, such as via the configuration port 9.

Figure 2:
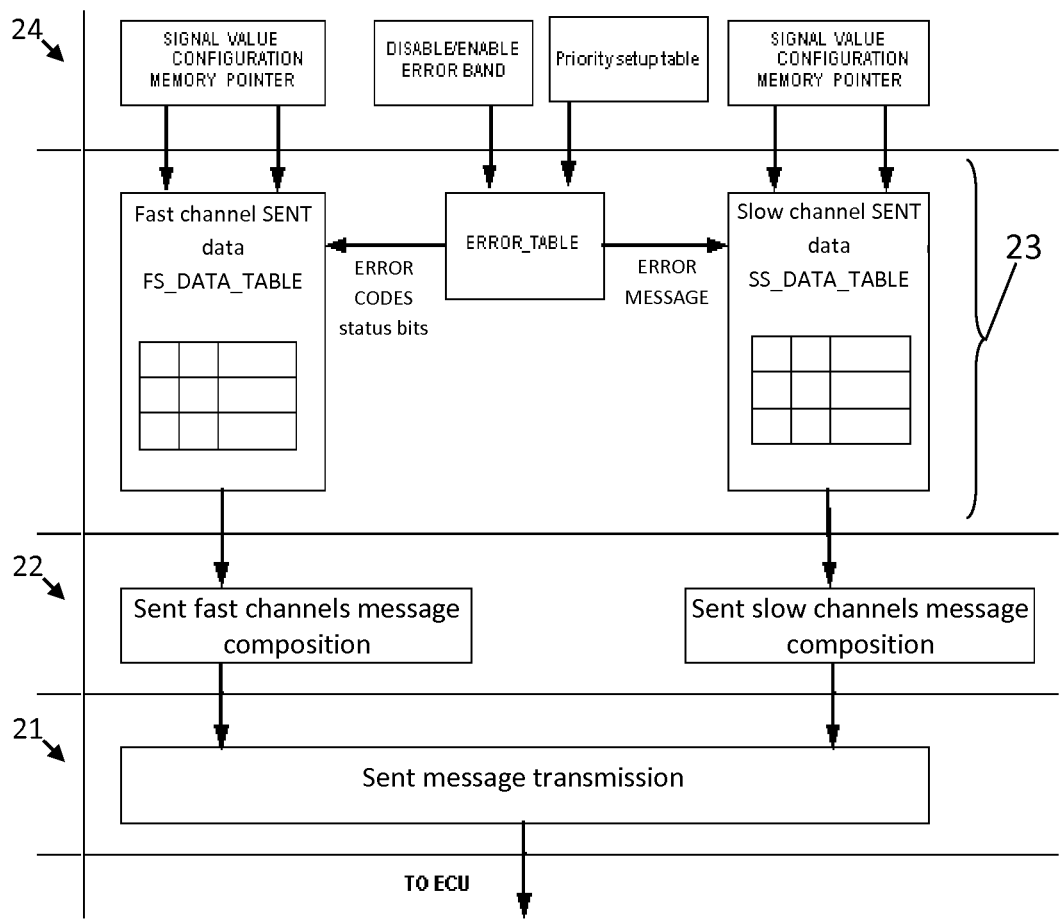
FIG. 2 shows an exemplary data flow structure of a device according to embodiments of the present invention.

An exemplary data flow structure of a device according to embodiments of the present invention is shown in FIG. 2.

The device hardware 21 may be adapted for performing the SENT message transmission, e.g. via the output port 5 under control of the processing means 2, to a receiver, e.g. an ECU. The device hardware 21 may be controlled by a firmware product 22, e.g. may execute on the processing means 2. The firmware product 22 may handle SENT slow channels message composition and SENT fast channels message composition. This message composition may be performed taking into account the configuration data stored by the configuration means 3, e.g. by taking into account at least one fully configurable data structure 23.

This data structure may for example comprise a table of errors ERROR_TABLE, which may be set up to link any or each error to a fast channel SENT data configuration table FS_DATA_TABLE, e.g. for defining a corresponding fast channel error code and/or a corresponding status bit to flag, and/or to a slow channel SENT data configuration table SS_DATA_TABLE, e.g. for defining a corresponding error message.

The configuration means 3 may receive inputs 24 to reconfigure the stored configuration data, e.g. may receive signal value configuration or memory pointer data for changing an entry in the fast or slow channel configuration table, and/or an instruction to enable or disable an entry in the table of errors and/or a priority setup table.

In a second aspect, the present invention also relates to a method for controlling an integrated circuit device adapted for transmitting data via a data stream in accordance with a single-edge nibble transmission protocol, e.g. for controlling a device according to embodiments of the first aspect of the present invention. Specific details relating to such method according to embodiments will be clear in view of the description provided hereinabove in relation to the first aspect of the present invention.

Figure 3:
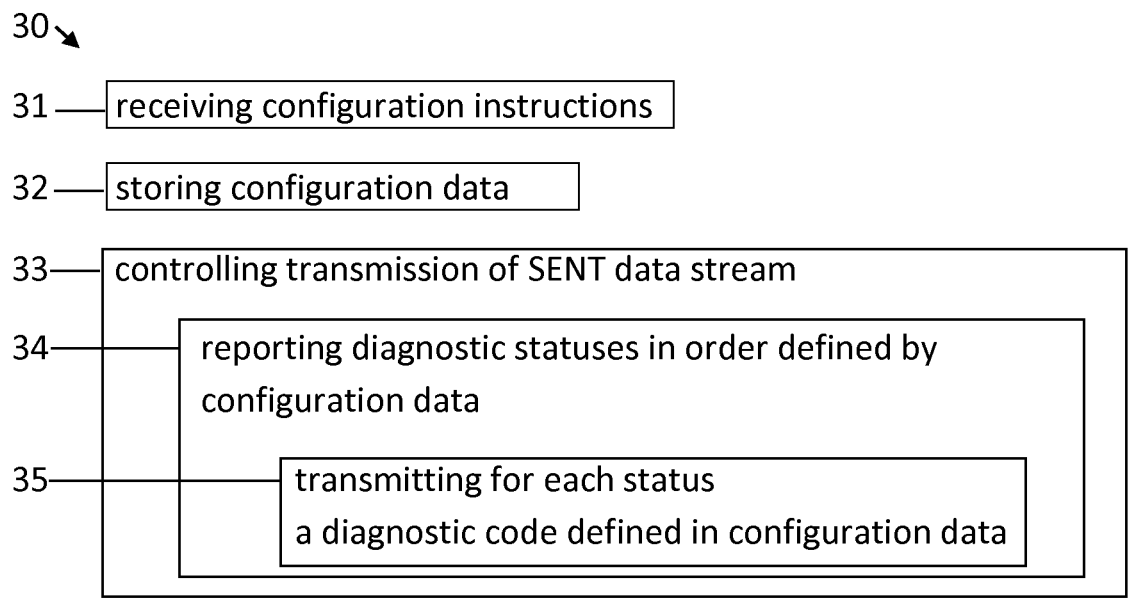
FIG. 3 shows an exemplary method according to embodiments of the present invention.

FIG. 3 shows an exemplary method 30 according to embodiments of the present invention. The method 30 comprises receiving 31 configuration instructions from a user and storing 32 configuration data in accordance with these configuration instructions. Such receiving and storing may be performed by a configuration means of a device according to embodiments of the present invention, for instance as explained hereinabove; for example configuration instructions may be received via a configuration input port and corresponding configuration data may be stored in a configuration memory, e.g. a reprogrammable non-volatile memory.

The method 30 further comprises controlling 33 a transmission of a data stream in accordance with a single-edge nibble transmission protocol. For example, this controlling may be performed by a processing means, e.g. a processor, as explained hereinabove. The controlling 33 of the transmission of the data stream furthermore comprises reporting 34 a plurality of diagnostic statuses via the data stream by transmitting 35 for each diagnostic status a corresponding diagnostic code defined by the configuration data, e.g. stored in the configuration memory. Reporting the plurality of diagnostic statuses is furthermore performed in a diagnostic status reporting order defined by the configuration data, e.g. stored in the configuration memory.

Controlling 33 of the transmission may furthermore comprise retrieving at least one address pointer from the configuration data in order to reference data or reference a program routine for acquiring such data, and transmitting these data in a SENT fast channel or in a SENT slow channel message of the data stream.

Controlling 33 of the transmission may also comprise detecting the plurality of diagnostic statuses and setting a status bit state in a status and communication nibble transmitted via the data stream taking into account the detected diagnostic statuses and a status bit mask in the configuration data.

Reporting 34 the plurality of diagnostic statuses may also comprise transmitting 35 a diagnostic code value via a SENT fast channel and/or via a SENT slow channel message.

The invention claimed is:

1. An integrated circuit device comprising:
   an output port for transmitting a data stream;
   a processor that controls transmission of said data stream in accordance with a single-edge nibble transmission protocol; and
   a configuration means that receives and stores configuration data that includes a plurality of diagnostic codes and a diagnostic status reporting order;
   wherein said processor reports a plurality of diagnostic statuses via said data stream by transmitting for each diagnostic status a corresponding diagnostic code of the plurality of diagnostic codes defined by said configuration data; and
   wherein the processor reports said plurality of diagnostic statuses in the diagnostic status reporting order defined by said configuration data.

2. The integrated circuit device according to claim 1, wherein said configuration means is adapted for receiving configuration instructions from a user and for storing said configuration data in accordance with said configuration instructions.

3. The integrated circuit device according to claim 1, wherein the processor is adapted for retrieving at least one address pointer from the configuration means, wherein said at least one address pointer references data or references a program routine for acquiring said data, wherein said data is to be transmitted in a corresponding SENT fast channel or in a corresponding SENT slow channel message of the data stream.

4. The integrated circuit device according to claim 1, wherein the processor is adapted for detecting the plurality of diagnostic statuses and for setting a status bit state in a status and communication nibble transmitted via the data stream taking into account the detected diagnostic statuses and a status bit mask in the configuration data.

5. The integrated circuit device according to claim 1, wherein the processor is adapted for reporting at least one diagnostic status of said plurality of diagnostic statuses by transmitting a diagnostic code value via a SENT fast channel.

6. The integrated circuit device according to claim 1, wherein the processor is adapted for reporting at least one diagnostic status of said plurality of diagnostic statuses by transmitting a diagnostic code value via a SENT slow channel message.

7. The integrated circuit device according to claim 1, wherein the processor is adapted to retrieve at least one value from the configuration means for selecting the number of nibbles to transmit per SENT telegram.

8. The integrated circuit device according to claim 1, wherein said configuration means comprises a configuration memory for storing said configuration data.

9. The integrated circuit device according to claim 1, furthermore comprising input/output means for acquiring and digitizing data.

10. The integrated circuit device according to claim 9, in which the processor comprises a data memory and an instruction memory.

11. The integrated circuit device according to claim 10, in which the instruction memory comprises instructions according to a program logic for controlling the input/output means such as to acquire and digitize data, and for controlling the data transmission via the output port such as to comply with the SENT protocol.

12. A method for controlling an integrated circuit device adapted for transmitting data via a data stream in accordance with a single-edge nibble transmission protocol, the method comprising:

receiving configuration instructions from a user;

storing configuration data in accordance with said configuration instructions, said configuration data including a plurality of diagnostic codes and a diagnostic status reporting order; and controlling a transmission of a data stream in accordance with a single-edge nibble transmission protocol;

wherein said controlling of said transmission of said data stream comprises reporting a plurality of diagnostic statuses via said data stream by transmitting for each diagnostic status a corresponding diagnostic code of the plurality of diagnostic codes defined by said configuration data; and wherein said reporting said plurality of diagnostic statuses is performed in the diagnostic status reporting order defined by said configuration data.

13. The method according to claim 12, wherein said controlling of the transmission furthermore comprises retrieving at least one address pointer from said configuration data in order to reference data or reference a program routine for acquiring said data, and transmitting said data in a corresponding SENT fast channel or in a corresponding SENT slow channel message of the data stream.

14. The method according to claim 12, wherein said controlling of the transmission comprises detecting the plurality of diagnostic statuses and setting a status bit state in a status and communication nibble transmitted via the data stream taking into account the detected diagnostic statuses and a status bit mask in the configuration data.

15. The method according to claim 12, wherein said reporting the plurality of diagnostic statuses comprises transmitting a diagnostic code value via a SENT fast channel and/or via a SENT slow channel message.

\* \* \* \* \*